United States Patent [19]

Esper et al.

[11] 4,019,914

[45] Apr. 26, 1977

[54] METHOD OF MANUFACTURING α-ALUMINA

[75] Inventors: Friedrich Esper, Leonberg; Karin Bethge, Stuttgart, both of Germany

[73] Assignee: Robert Bosch G.m.b.H., Stuttgart, Germany

[22] Filed: June 24, 1974

[21] Appl. No.: 482,458

[30] Foreign Application Priority Data

June 27, 1973 Germany .......................... 2332561

[52] U.S. Cl. .................................. 106/62; 106/65; 106/66; 106/73.4; 423/625

[51] Int. Cl.² .................. C04B 35/04; C04B 35/10; C04B 35/12

[58] Field of Search ............. 423/625, 628; 106/65, 106/66, 62, 73.4

[56] References Cited

UNITED STATES PATENTS

| | | | |
|---|---|---|---|
| 3,238,049 | 3/1966 | Somers | 106/73.4 |
| 3,377,176 | 4/1968 | Wolkodoff et al. | 106/65 |
| 3,615,775 | 10/1971 | Teeter | 106/62 |
| 3,637,406 | 1/1972 | Bailey | 423/628 |
| 3,772,416 | 11/1973 | Clendenen | 106/65 |
| 3,854,965 | 12/1974 | Niwa et al. | 106/62 |

*Primary Examiner*—Herbert T. Carter
*Attorney, Agent, or Firm*—Flynn & Frishauf

[57] ABSTRACT

A method of manufacturing α-alumina with a degree of purity of at least 98% which has a high sintering activity. The α-alumina contains at least 98% α-$Al_2O_3$ and not more than 0.1% Na (calculated as $Na_2O$), and not more than 0.1% Ti (calculated as $TiO_2$). The α-alumina also contains between 0.03% and 2% of $Fe_2O_3$ and/or $Cr_2O_3$. The α-alumina is formed by first fine grinding and then calcining, preferably at a temperature between about 1120° C and 1350° C, an aluminum hydroxide and/or hydrated aluminum oxide. The α-alumina is then cooled and finely ground to provide an α-alumina having excellent sintering activity.

9 Claims, No Drawings

METHOD OF MANUFACTURING α-ALUMINA

In the conventional calcination process for producing α-alumina, an aluminum hydroxide or hydrated aluminum oxide, which are the major constituents of the raw material, is heated to drive off the chemically combined water. The resultant so-called transition alumina should change into α-alumina during the subsequent heating. In order to speed up these reactions, agents, referred to as calcination auxiliary agents, for example, boron trioxide and/or aluminum fluroide, are added to the reaction mixture prior to calcination. It has been found that the aforesaid agents indirectly can have a disadvantageous effect on the characteristics of the sintered bodies subsequently produced from the α-alumina product of calcination with such auxiliary agents. Additionally, it has been found that the formation of the α-alumina is not sufficiently direct, i.e., it does not occur at a sufficiently low temperature. It has also been found that there is growth in the size of the ultimate grains of the alumina during this period of formation of the α-alumina which is extremely undesirable. Further shortcomings occur by the ultimate crystals of α-alumina formed by calcination subsequently sintering together during the process yet. The latter occurrences are retarded by calcining at a low temperature, while on the contrary, the formation of the α-alumina is accelerated by calcining at an elevated temperature.

The prior art has also known that when calcining hydrated aluminum oxide (alumina-hydrate) or the "transistion alumina" at relatively low temperature, crystals were produced which were only about as small as 0.3 μ and that in such products, the crystallites are fused together into aggregates which prevent packing when green pressed to obtain a satisfactory density. The product α-alumina so produced also still contained up to 15% in the θ-or other transition modification of alumina (U.S. Pat. No. 3,370,017).

The prior art has attempted to produce α-alumina by varying the process substantially to avoid the inherent disadvantage of the aforesaid processes. Said U.S. Pat. No. 3,370,017 discloses attempts wherein the product is produced in the form of a sol. U.S. Pat. No. 3,516,840 discloses another attempt to improve the prior art processes by providing a mixed α-alumina composition specifically designed for the manufacture of fired ceramic bodies. This mixed composition contains two separate alumina components; one having a median size of 2.5–6 microns and the other having a median size of about 1 micron. The first (the larger) component constitutes 20–80% of the mixture and the second constitutes 80–20% of the mixture.

The present invention provides a solution to the difficulties inherent in the prior art calcination method, i.e., it provides a process wherein the α-alumina is formed at a sufficiently low temperature and wherein there is no undue growth of the α-alumina crystals and no strong sintering of such crystals into agglomerates.

SUBJECT MATTER OF THE INVENTION

The present invention provides a process for preparing α-alumina with a degree of purity of at least 98% having high sinter activity, i.e., ceramic bodies may be formed from this α-alumina readily. The α-alumina is formed by finely grinding a source material selected from the group consisting of aluminum hydroxide and hydrated aluminum oxide. This is admixed with at least one calcination auxiliary agent selected from the group consisting of $Fe_2O_3$ and $Cr_2O_3$ in an amount of between about 0.03% and 2% based on the total $Al_2O_3$. The said calcination auxiliary agent(s) are preferably admixed with the aluminum oxide-containing source material by fine grinding them together. The said finely ground admixture of said aluminum hydroxide and/or hydrated aluminum oxide together with said calcination auxiliary agent(s) is then calcined, preferably at a temperature between 1120° C and 1350° C.

In order to obtain the benefits of the present invention, the aforesaid source material and the product α-alumina particles should contain not more than 0.1% Na (calculated as $Na_2O$) and not more than 0.1% Ti (calculated at $TiO_2$). It is preferred to use relatively pure raw materials so that the impurities, such as Na or Ti, are under the aforesaid specified amounts. Relatively pure source materials of alumina oxide include hydrargillite (also known as gibbsite), boehmite and the so-called alumina hydrate product of the Bayer process, which is of the hydrargyllite type.

Industry has required of α-alumina particles which are to be used for producing ceramic bodies, that blanks being formed in a conventional manner from ground α-alumina particles without the addition of fluxing agents, and then fired for at most 2 hours, form sintered ceramic bodies having a density of at least 3.90 g/cm³. It is also required that an average ultimate grain size of the said α-alumina should be below 0.5 μm, and it is also required that agglomerates of said ultimate grains of α-alumina should be ground without difficulty. The α-alumina product of the process of the present invention meets these requirements as established in the examples herein.

If the aforesaid source materials used in the process of the present invention already contain iron oxide and/or chromium oxide, for example, the iron oxide containing product which may be obtained from the Bayer process, the calcination auxiliary agents of the present invention, i.e., the $Fe_2O_3$ and/or the $Cr_2O_3$, may be added in a lesser amount or possibly may not be added if sufficient is present in the said source material. However, in such instances, if need arise, it is necessary in order to carry out the present invention to grind the starting mass so that the particle size is sufficiently reduced so that the $Fe_2O_3$ present in the said source material may become effective as a said calcining auxiliary agent during the subsequent calcining stage of the process of the present invention.

The particle size required is not more than 0.4 μm corresponding to a specific surface of at least 5 m²/g, preferably not more than 0.2 μm corresponding to a specific surface of at least 10 m²/g.

In the prior art there was no need for the costly step of fine grinding the starting mass because the process of forming the α-alumina in itself, even with usual calcination auxiliary agents being added, has its run only weakly influenced by the grain size of the raw material but is essentially influenced by temperature and duration of the process. Contrary to that prior art, in the process according to the invention it is additionally aimed to obtain a special, favourable structure of the particles of the product by cooperation of the aforesaid impurities and/or additives ($Fe_2O_3$ and/or $Cr_2O_3$). It is evident that the reaction achieving this requires a sufficient specific surface of the starting mass, i.e. a sufficiently little grain size, and therefore fine grinding is necessitated.

It is known in the prior art that the addition of MgO to α-alumina which is to be used in the manufacture of fired alumina ceramic bodies is advantageous (DT-OS 2 111 583). The MgO acts as a grain growth inhibitor. It has also proven to be of advantage in the process of the present invention to add up to about 0.5% MgO to the admixture containing the aluminum oxide source material which is calcined. It is preferred to admix said MgO with the said aluminum oxide source material by finely grinding them together.

The details of and the resultant improved products of the present invention are illustrated in the examples. All parts and percentages throughout this specification are by weight. The raw materials utilized in the examples are set forth in the following table.

| Raw Material | Spec. Surface $m^2/g$ | Impurities |
|---|---|---|
| 1. Boehmite A | 124 | $Na_2O \leq 0.01\%$; $Fe_2O_3 \leq 0.01$: $TiO_2 < 0.01\%$ |
| 2. Boehmite B | 152 | $Na_2O \leq 0.01\%$; $Fe_2O_3 \leq 0.01$: $TiO_2 < 0.1\%$ |
| 3. Hydrargillite C | 0.07 | $Na_2O = 0.05\%$; $Fe_2O_3 = 0.01 - 0.05\%$ $TiO_2 < 0.01\%$ |
| 4. Hydrargillite D | 0.1 | $Na_2O = 0.06\%$; $Fe_2O_3 \leq 0.02\%$ $TiO_2 < 0.01\%$ |
| 5. Hydrargillite E | 0.2 | $Na_2O = 0.4\%$ $Fe_2O_3 = 0.02\%$ $TiO_2 < 0.01\%$ |

Each of the afore-listed raw materials was then finely ground together with the addition agents noted in the examples hereinafter, for one hour in a 0.6 l-vibratory grinding mill. 0.5% of propane diol was also included in the grinding mixture as a grinding aid. The admixture formed during the aforesaid grinding was then calcined for 1 hour at the temperatures noted in the subsequent table to produce the α-alumina.

The product of the aforesaid calcination was then finely ground for 4 hours under the same conditions as the said first grinding operation. The resultant particles were then pressed into a shaped article under a pressure of 300 bar. The resultant green or so-called press densities are listed in the subsequent table. The green shaped articles were then sintered at 1600° C for 2 hours. The resultant densities of the sinter bodies (referred to as sinter densities) are listed in the subsequent table.

| Raw material | Additions | (%) | Calcination Temperature (° C) | Press Density (g/cm³) | Sinter Density (g/cm³) |
|---|---|---|---|---|---|
| Boehmite A | MgO | 0.2 | 1140 +) | 1.97 | 3.70 |
| " | MgO | 0.1 | 1140 | 1.98 | 3.78 |
| " | Fe₂O₃ MgO | 0.1 0.1 | 1120 | 1.94 | 3.93 |
| " | Cr₂O₃ MgO | 0.1 0.1 | 1120 | 1.96 | 3.93 |
| Boehmite B | Fe₂O₃ | 0.1 | | | |
| " | MgO | 0.1 | 1140 | 1.98 | 3.92 |
| " | Fe₂O₃ | 0.1 | 1140 | 1.97 | 3.91 |
| " | Cr₂O₃ MgO | 0.1 0.1 | 1120 | 1.97 | 3.91 |
| " | Cr₂O₃ | 0.1 | 1140 | 1.95 | 3.91 |
| " | Cr₂O₃ | 0.1 | 1140 | 1.95 | 3.91 |
| Hydrargillite C | MgO | 0.1 | 1200 | 1.81 | 3.89 |
| " | Fe₂O₃ MgO | 0.1 0.1 | 1200 | 1.86 | 3.93 |
| Hydrargillite D | MgO | 0.1 | 1150 | 1.79 | 3.82 |
| " | Fe₂O₃ MgO | 0.2 0.1 | 1100 | 1.71 | 3.92 |
| " | Cr₂O₃ MgO | 0.1 0.1 | 1120 | 1.79 | 3.94 |
| Hydrargillite E | MgO | 0.1 | 1220 | 1.81 | 3.79 |
| " | Fe₂O₃ MgO | 0.1 0.1 | 1200 | 1.80 | 3.80 |
| " | Cr₂O₃ MgO | 0.01 0.1 | 1200 | 1.84 | 3.83 |

+) before calcination no grinding

From the foregoing examples which utilized the conventional methods of grinding and pressing the shaped green body and firing, it is determined that in spite of the relatively low calcination temperature utilized in the method of the present invention, the sinter density obtained is excellent and in close proximity to the theoretical maximum value (approximately 4.00 g/cm³). The examples utilizing the hydrargillite E as the source material establish that when the source material contains 0.4% Na₂O, there is no substantial increase of the sintered density obtained even when utilizing addition of Fe₂O₃ pr Cr₂O₃ as the auxiliary calcination agent. In such examples, the minimal sinter density value of 3.90 g/cm³ was not obtained. The examples also establish that the desired minimum sinter density is not obtained when using an addition only of MgO.

U.S. Pat. No. 3,370,017 includes in its definition of the term "corundum" the α-crystalline form of pure alumina which may contain up to 3% of metal oxides such as Fe₂O₃ which form a solid solution within the α-alumina crystalline lattice. The said patent does not disclose the origin and the manufacture of such aluminas nor does it disclose what part, if any, the said metal oxides have in the process according to the said invention. The process disclosed by said patent essentially consists in fine grinding and then treating the said "corundum" with hydrofluouric acid, in order to purify it by dissolving and so removing said metal oxides and those oxides of aluminum which are not of the α-modification and therefore soluble in hydrofluouric acid too, whereby evidently the fine grain of the said corrundum obtained by grinding increases the dissolving effect of hydrofluouric acid.

This known process does not fall within the species of process according to the invention, which is a process of manufacturing α-alumina by calcining.

We claim:
1. A process for preparing a finely ground α-alumina with a degree of purity of at least 98% consisting of
a. grinding a mixture of (i) at least one alumina source material selected from the group consisting of aluminum hydroxide and hydrated alumina oxide, and (ii) at least one calcination auxilary agent selected from the group consisting of Fe₂O₃ and Cr₂O₃ in an amount of between 0.03% and 2% by weight based on the total Al₂O₃, to produce an admixture of said alumina souce material and said calcination auxiliary agent ground to a grain size of not more than 0.4 μm which corresponds to a specific surface of at least 5 m²/g, said alumina source material containing not more than 0.1% Na, calculated as Na₂O and not more than 0.1% Ti, calculated as TiO₂, b. calcining said admixture at a temperature of between about 1120° C and 1350° C until said alumina source material is converted into α-alumina with a degree of purity of at least 98%, and
c. cooling said calcined α-alumina and then finely grinding said calcined α-alumina to produce a finely ground α-alumina having excellent sintering activity.

2. The process of claim 1 wherein the said admixture is ground to a grain size of not more than 0.2 μm which corresponds to a specific surface of at least 10 m²/g.

3. The process of claim 1 wherein the said admixture contains a total of said calcination auxiliary agent in an amount between 0.05 and 0.2% and wherein the α-alumina product having excellent sintering activity contains at least 98% α-alumina.

4. The process of claim 3 wherein said admixture also contains MgO in an amount up to 0.5%.

5. The process of claim 4, wherein said admixture is prepared by mixing said alumina oxide source material with said MgO and said calcination auxiliary agent and then finely grinding to form a homogeneous admixture.

6. The process of claim 1 wherein said admixture also contains MgO in an amount up to 0.5%.

7. The process of claim 1 wherein said admixture is prepared by mixing said source material with said calcination auixiliary agent and then finely grinding to form a homogeneous admixture.

8. The process of claim 1 wherein said admixture is prepared by finely grinding the said source material which also contains at least one compound selected from the group consisting of $Fe_2O_3$ and $Cr_2O_3$ in an amount up to about 2%, sufficiently so that said $Fe_2O_3$ or $Cr_2O_3$ can become effective as said calcination auxiliary agent during said calcination, the grain size to be obtained by grinding being not more than 0.4 μm which corresponds to a specific surface of at least 5 m²/g.

9. The process of claim 8 wherein the grain size to be obtained by grinding is not more than 0.2 μm, corresponding to a specific surface of at least 10 m²/g.

* * * * *